Nov. 6, 1956 T. H. KRUEGER 2,769,633
DISPENSER FOR PRESSURE SENSITIVE ADHESIVE TAPE
Filed May 11, 1951 5 Sheets-Sheet 1

INVENTOR.
THEODORE H. KRUEGER
BY
Moses, Nolte, Crews & Berry
ATTORNEYS

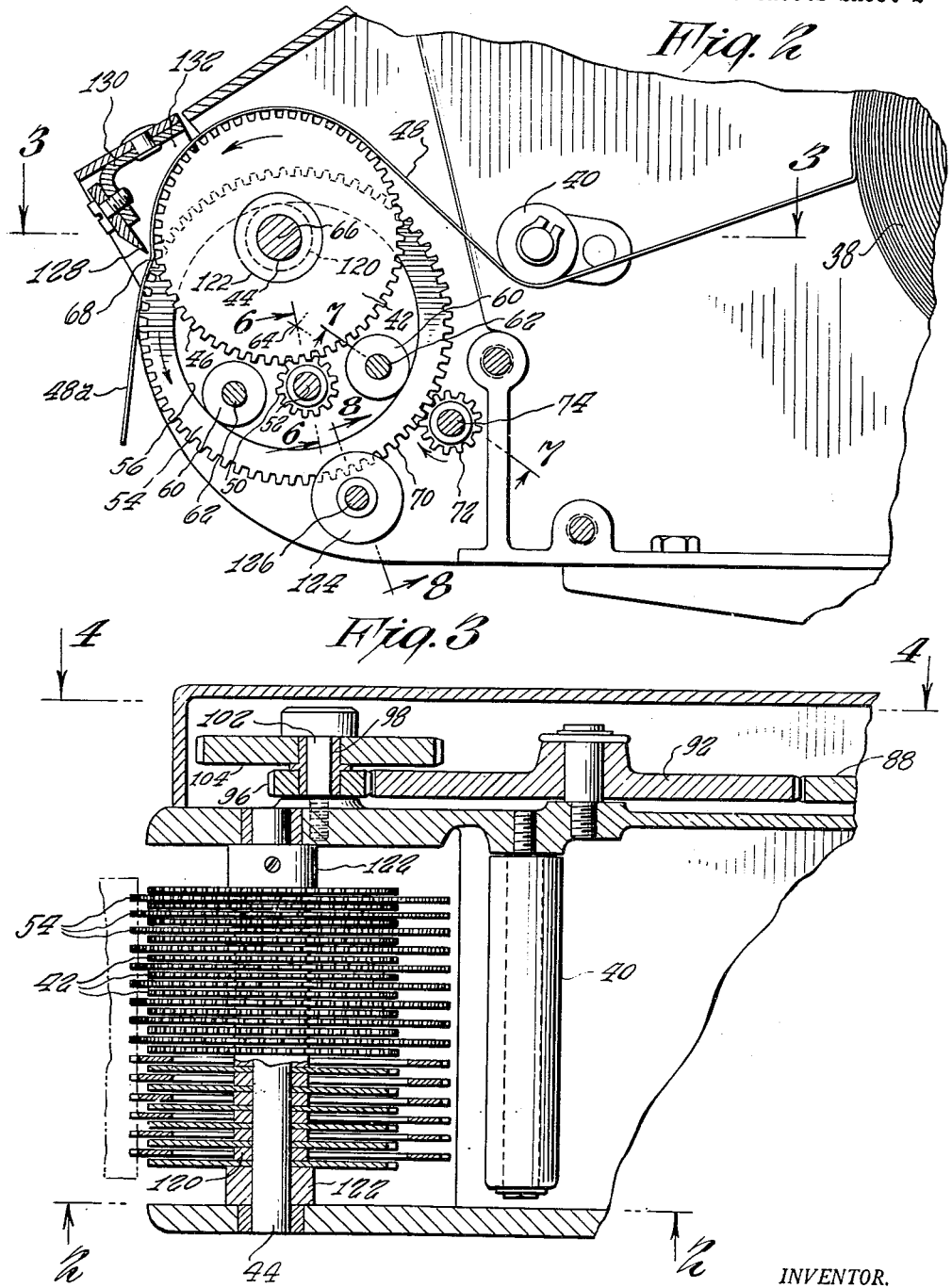

Nov. 6, 1956 T. H. KRUEGER 2,769,633
DISPENSER FOR PRESSURE SENSITIVE ADHESIVE TAPE
Filed May 11, 1951 5 Sheets-Sheet 3
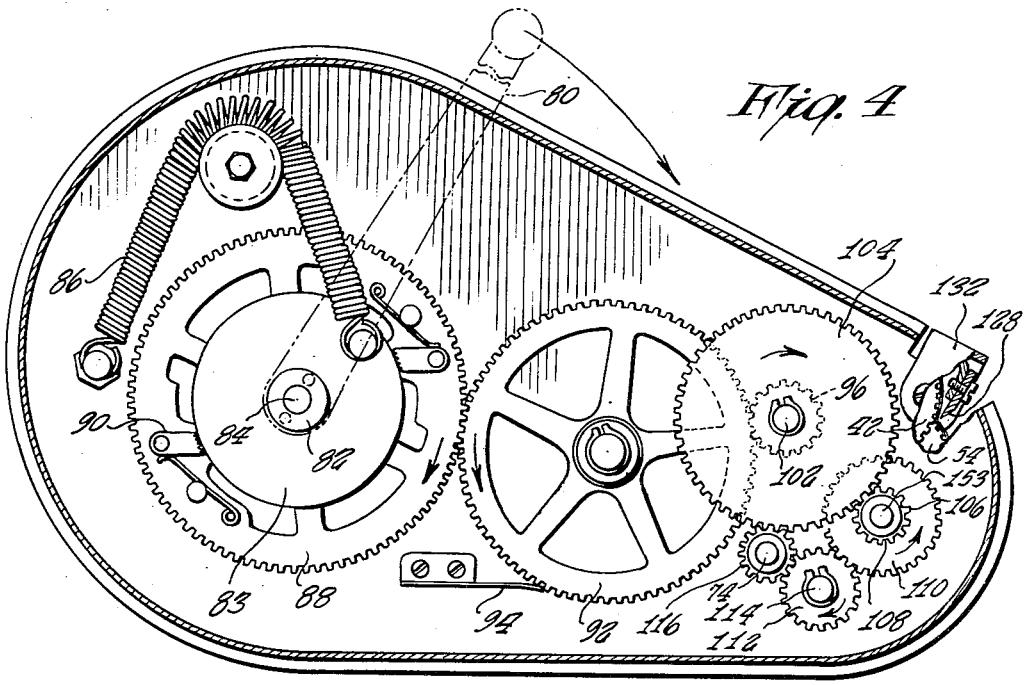
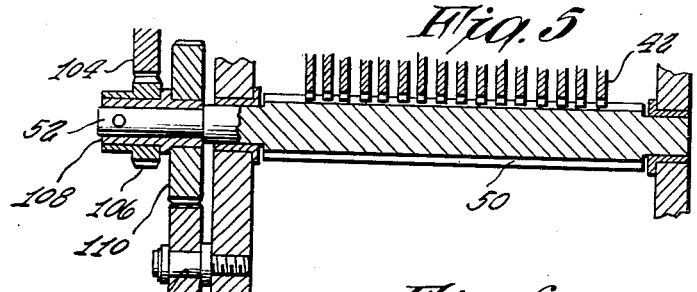
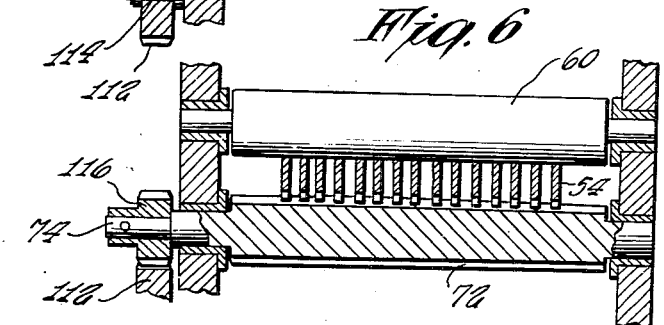
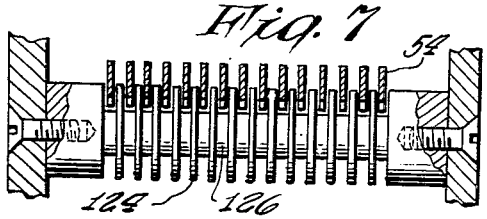
INVENTOR.
THEODORE H. KRUEGER
BY
Moses, Nolte, Cewer & Berry
ATTORNEYS Nov. 6, 1956     T. H. KRUEGER     2,769,633
DISPENSER FOR PRESSURE SENSITIVE ADHESIVE TAPE
Filed May 11, 1951     5 Sheets-Sheet 4

$$\cos(180°-\theta) = \frac{(RF)^2 + (RP)^2 - (OC)^2}{2(RF)(RP)}$$

$$\cos(180°-\theta) = \frac{(RF)^2 + (RP)^2 - (OC)^2}{2(RF)(RP)}$$

$$\cos(180°-\theta) = \frac{(RF)^2 + (RP)^2 - (OC)^2}{2(RF)(RP)}$$

INVENTOR.
THEODORE H. KRUEGER
BY
Moses, Nolte, Crews + Berry
ATTORNEYS

Nov. 6, 1956  T. H. KRUEGER  2,769,633
DISPENSER FOR PRESSURE SENSITIVE ADHESIVE TAPE
Filed May 11, 1951  5 Sheets-Sheet 5

$$\cos(180° - \theta) = \frac{RF'}{RP}$$

$$\sin\left(\frac{180° - \theta}{2}\right) = \frac{RP2 - RF2}{OC}$$

INVENTOR.
THEODORE H. KRUEGER
BY
Moses, Nolte, Crewe + Berry
ATTORNEYS

United States Patent Office 2,769,633
Patented Nov. 6, 1956

2,769,633

DISPENSER FOR PRESSURE SENSITIVE ADHESIVE TAPE

Theodore H. Krueger, Stratford, Conn., assignor to Better Packages Incorporated, a corporation of New York Application May 11, 1951, Serial No. 225,815

10 Claims. (Cl. 271—2.4)

This invention relates to dispensers or feeding devices for pressure sensitive adhesive tape. Because of its normally adhesive or tacky character, the handling of such tape presents many problems not encountered in devices for dispensing or feeding tape strips or sheets of any kind which do not have pressure sensitive adhesive properties. Pressure sensitive adhesive tape tends to stick to anything with which it comes in contact, and therefore cannot be fed by ordinary pairs of feed rolls because it will stick to the feed roll engaging its tacky side and tend to follow it around instead of being delivered to an accessible position.

Numerous attempts have been made to deal with the problem of feeding pressure sensitive adhesive tape. For example, in McCarthy Patents No. 1,972,850 and No. 1,972,851, mechanisms are shown in which the tape is fed by a group of feed discs and a second group of toothed discs is provided for peeling the tape off of the first discs and delivering it to the user. The discs constituting the two groups overlap so that the peeling discs tend to lift the tape from the discs of the feeding group before the tape follows around the feeding discs to the point where it would become entangled in the apparatus. This construction may be made to work to a degree with certain types of pressure sensitive adhesive strips, such as those which have very limp cloth backing and are of limited adhesive character, but are entirely incapable of feeding many important types of tape. In the construction shown in the McCarthy patents it is evident that the groups of discs cannot overlap beyond the point where the peripheries of one group of discs, the larger if they are not of the same diameter, will contact the axle or shaft upon which the discs of the other group are necessarily mounted. Owing to this limitation, the peripheries of the discs of the two groups intersect at a considerable angle, as measured between the tangents to the two disc groups at the point of intersection. This angle may be termed the "tangent" angle. If this angle is relatively sharp, for example approximately a right angle, which is near the optimum condition practically obtainable with the McCarthy construction, serious difficulties are encountered. The chief of these difficulties is the fact that most tapes will be caused to curl up outwardly at the leading end so that the tape will be coiled upon itself in a coil as it is being fed instead of issuing from the machine in a more or less straight condition in which it can be removed and applied for its intended use. The curling up of the end of the tape effectually prevents successful operation of the machine. This curling of the end of the tape appears to be due to the fact that with the relatively sharp tangent angle which is inherent in the McCarthy type of machine, the end of the tape is given such a pronounced bend when stripped from the feeder discs by the peeler discs that it will coil upon itself instead of being left so nearly straight that it will hang down by gravity.

In accordance with the present invention, feed means are provided utilizing moving feed and peeling surfaces in which the tangent angle between the feeding surfaces and the peeling surfaces may be made so obtuse that all commercial types of tape may be successfully fed and peeled off the feed surfaces and delivered in usable condition. Various means may be provided for constructing and arranging the parts so as to secure this result. Where both the feed members and peeler members are circular discs, this is accomplished by forming the parts in such a way that the centers of rotation of the two groups of discs may be brought nearer together than the radius of either group of discs, so that the center of rotation of one set of discs lies within the circumference of the other set of discs. In this way the tangent angle may be made very obtuse so that the tape may pass easily from the feed discs to the peeler discs without being bent or deflected to an extent which can interfere with successful operation and which will not result in curling the end of the tape.

In other embodiments of the invention, endless belts may be used to feed or peel the tape or for both purposes. In all of these constructions it is possible to secure a very obtuse tangent angle between the feed surfaces and the peeling surfaces so as to insure proper handling of all types of pressure sensitive adhesive tapes.

In the accompanying drawings which illustrate certain embodiments of the invention illustrative of the principles thereof, Figure 1 is a perspective view of one form of dispenser utilizing two groups of overlapping discs;

Figure 2 is a vertical sectional view of the dispensing part of the apparatus, this section being taken on line 2—2 of Fig. 3;

Figure 3 is a horizontal sectional view on line 3—3 of Fig. 1, the discs constituting the feed and peeler rolls being shown in elevation and no tape being illustrated;

Figure 4 is a side elevation of the dispenser casing and gearing taken on line 4—4 of Fig. 3;

Figure 8:
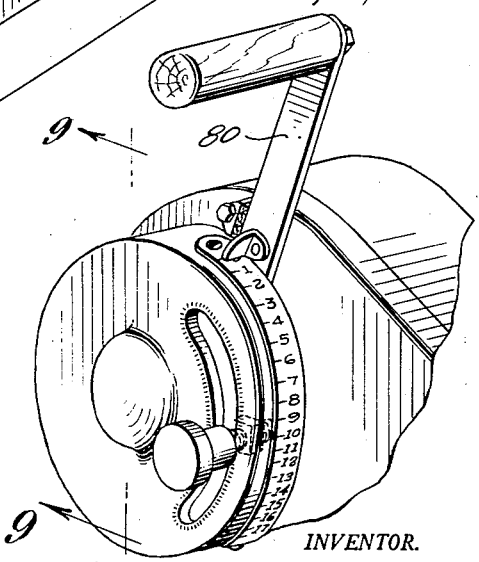
Figure 9:
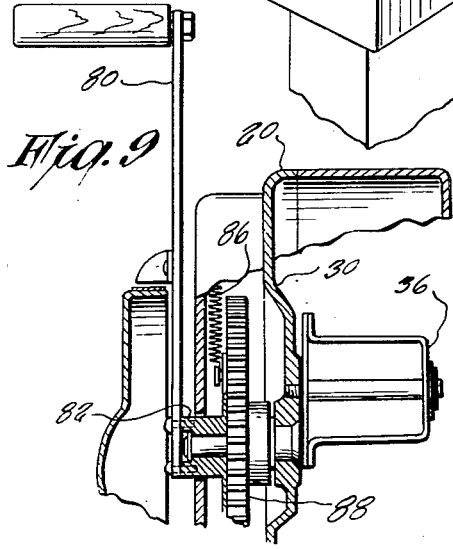
Figure 10:
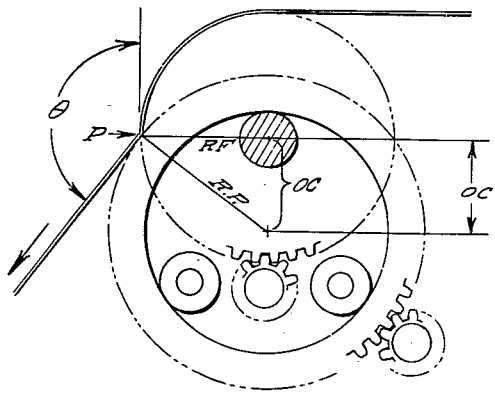
Figure 11:
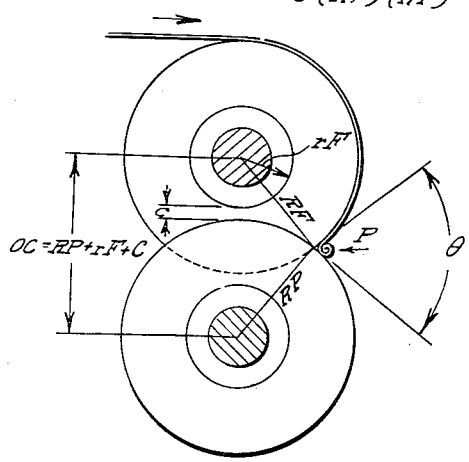
Figure 12:
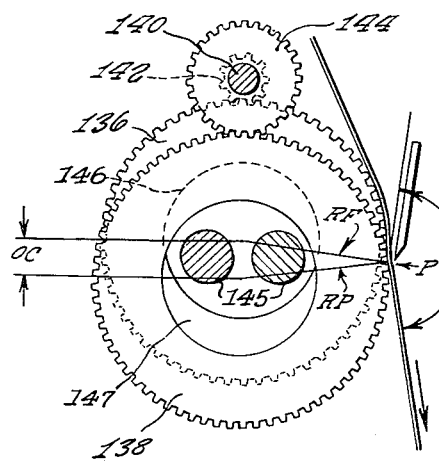
Figure 13:
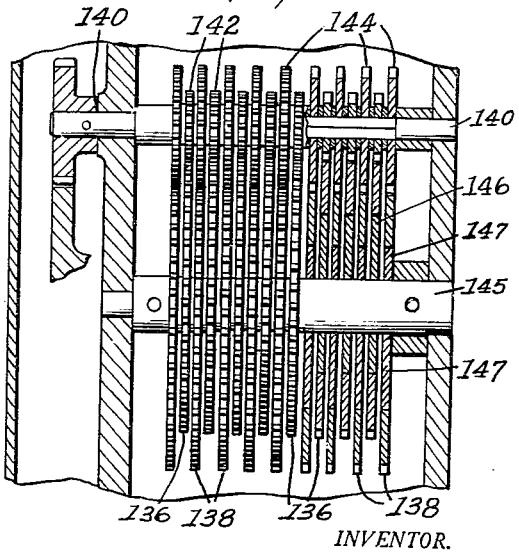
Figure 14:
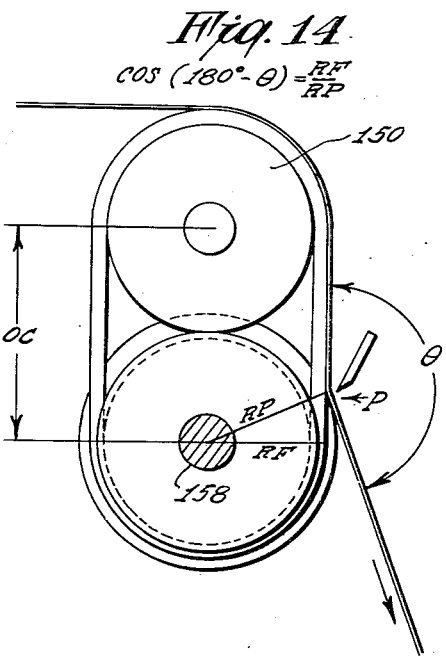
Figure 15:
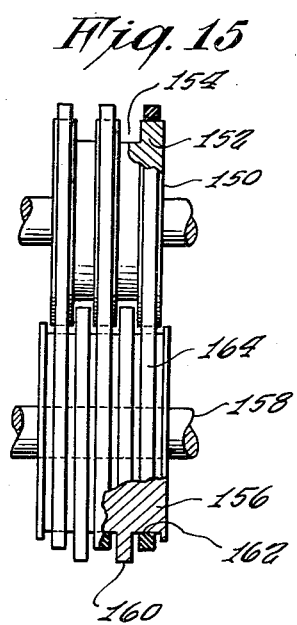
Figure 16:
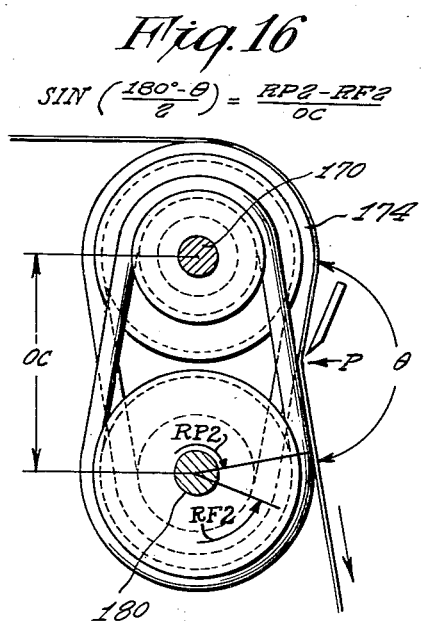
Figure 17:
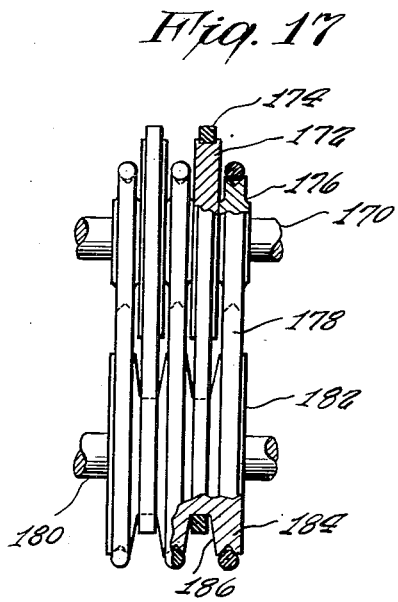

Figures 5, 6 and 7 are fragmentary transverse sectional views taken on lines 5—5, 6—6 and 7—7, respectively, of Fig. 2;

Figure 8 is a fragmentary perspective view showing one arrangement of the operating lever, adjustable stop means therefor and feed indicating scale;

Figure 9 is a fragmentary sectional view on line 9—9 of Fig. 8;

Figure 10 is a diagram showing the feed disc arrangement of the machine shown in Figs. 1 to 9 and illustrating the tangent angle and also showing the formula by which such angle may be determined;

Figure 11 is a similar diagram showing the tangent angle obtainable with a typical example of the construction of the McCarthy patents;

Figure 12 is a diagrammatic side elevation showing a modified construction of feed discs embodying the invention;

Figure 13 is a fragmentary sectional view of a part of the machine embodying the feed disc construction of Fig. 12, the feed discs being shown partly in elevation and partly in vertical section;

Figure 14 is a side elevation showing the feeding element of a modified form of the machine embodying the invention, in which a series of feed belts are provided and which incorporates a series of peeler discs, the appropriate formula for determining the tangent angle appearing on this figure;

Figure 15 is a fragmentary front elevation of the feed elements of the construction shown in Fig. 14, parts being shown in section;

Figure 16 is a view similar to Fig. 14, showing another construction embodying the invention in which both the feeding elements and the peeler elements are endless belts; and Figure 17 is a fragmentary front elevation of the elements shown in Fig. 16, parts being shown in section.

Referring to the particular embodiment of the invention illustrated in Figs. 1 to 9, a housing 20 containing the dispensing devices is mounted upon a base 22 which may be set upon a table or counter or secured thereto in any suitable manner, as by bolts 24. In this embodiment of the invention, the housing 20 is mounted on the base so that it may swivel thereon about a vertical axis and be locked in any desired position by a hand screw 26. The casing 20 is provided with a pivoted cover member 28 shown swung to open position in Figure 1. The casing 20 has a fixed side plate 30 upon which the operating gearing and feeding devices are supported and has a partial side plate 32 containing bearings for a feed roll shaft and other parts. This plate 32 is fixed to the bottom wall 34. Rotatably mounted on the side plate 30 is a tape spindle 36 for holding a roll 38 of pressure sensitive adhesive tape. A guide roller 40 is also conveniently mounted on the plate 30, under which the tape from the roll 38 is led, the non-tacky side of the tape engaging such roller. The tape feed mechanism comprises a series of feed discs 42 mounted on a shaft 44 and separated by spacing rings 120. The tacky side of the tape passes in contact with the periphery of these discs so that if the discs are rotated they will exert sufficient pull on the tape to pull it from the roll 38. As will be understood, with the more tacky tapes the successive layers of tape on the roll adhere to one another with a considerable degree of adhesion, so that a substantial pull is usually necessary to feed the tape. The exerting of this pull by the feed discs has the effect of causing the tape to adhere very firmly to the latter, so that means must be provided for peeling or stripping the fed tape from the feed discs, otherwise it will simply wind up thereon and there would be no tape fed out of the machine.

In the construction illustrated, the discs 42 are provided on their peripheries with gear teeth 46 which engage the adhesive surface of the tape 48 coming from the roll 38 in a firm manner without danger of slipping. Also, owing to the broken character of the surfaces produced by the teeth, the tape is prevented from adhering so tightly to the discs that it cannot be readily stripped therefrom. The gear teeth also provide a convenient means by which the discs may be rotated. In the construction shown, this is done by the elongated spur pinion 50, the teeth of which mesh with the teeth 46. This pinion forms a part of or is mounted on a shaft 52.

For stripping or peeling the tape from the discs 42, a series of peeling discs or rings 54 is provided, these being shown as mounted between alternate discs 42. The rings 54 have center openings bounded by smooth circular walls 56 and are supported by engagement of these walls with three spaced supporting rollers. One of these rollers may comprise the shaft 44 on which the discs 42 are mounted. The inner surfaces of the peeling rings bear on the spacing rings 120 on this shaft. It is not essential, however, to combine this roller with this shaft, as separate means may be provided for constituting a support for the rings 54. The other supports for the rings 54 are shown as rollers 60 mounted on shafts 62, one of these rollers being mounted at each side of the pinion 50 in the lunette shaped space between the peripheries of the discs 42 and the inner surfaces 56 of the rings. The center or axis of rotation of the rings 54 is indicated at 64 and with this construction it will be seen that this axis falls within the circumference of the discs 42. Thus the distance between the axis of rotation 66 of the discs 42 and the axis of rotation 64 of the rings 54 is much less than the radius of either of the rotating members. This permits the rotating members or discs to overlap to such an extent that the angle between the tangents to the peripheries of the discs and rings at the point 68 where such peripheries intersect and which has been referred to above as the "tangent" angle, may be made as obtuse as is necessary. This angle is indicated by the character θ. (Fig. 10.)

Figure 1:
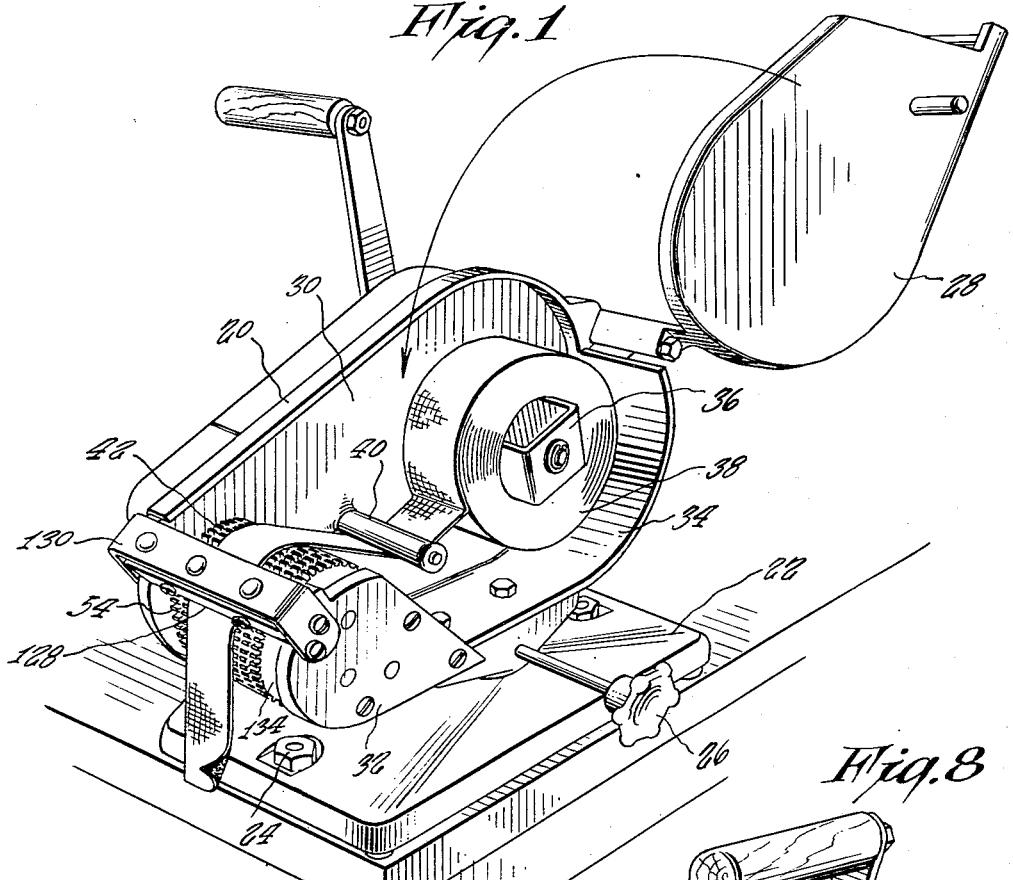

Any suitable means for rotating the peeling rings may be provided. As illustrated, the peeling rings are provided with gear teeth 70 which mesh with an elongated pinion 72 mounted on or formed integral with shaft 74. The teeth 70 form a broken surface for engagement with the adhesive surface of the tape, which prevents firm adhesion of the tape to such surface. Preferably the rings 54 are driven at a considerably faster rate than the discs 42. This causes the teeth to slide over the adhesive surface of the tape as the latter passes in contact with the peripheries of the rings and thereby prevents adherence between the tape and the teeth on the rings. The tape will be peeled cleanly from the discs 42 and will pass loosely over the teeth on the rings so that it will hang down freely, as indicated at 48a in Fig. 2. With the construction of machine shown in which the front end projects beyond the base 22, it is possible to mount the machine as shown in Fig. 1 so that the depending end of the tape will pass free of the base and table upon which it is mounted, and if a long piece of tape is desired it may hang freely down almost to the floor without encountering any object to which it will adhere.

Operating mechanism of any suitable type for operating the feeding and peeling discs may be provided. In the example shown, a reciprocating feed lever 80 is used which is fixed to the hub 82 of a ratchet disc 83 rotatably mounted on a stub shaft 84 (Figs. 4 and 9). The ratchet disc has a knurled or toothed periphery and a spring 86 is connected to the ratchet disc which returns the disc and feed lever to initial position when the feed lever is released after a feeding stroke. Mounted adjacent to the disc 83 is a gear 88 which carries a pair of spring pressed pawls 90 for engagement with the ratchet disc, so that when the lever and disc are rotated in feeding direction, the gear is turned with them. The gear 88 meshes with an idler gear 92. A detent spring 94 is shown as engaging the teeth of this gear so as to prevent possible retrograde movement thereof. The gear 92 meshes with a pinion 96 on a sleeve 98 which is rotatably mounted on a stub shaft 102. Also fixed to the sleeve is a gear 104 (Fig. 3), which meshes with a pinion 106, fixed to a sleeve 108 which is fixed on the end of shaft 52 carrying the pinion 50 which drives the feed discs 42. Also fixed to the sleeve 108 is a gear 110 (Fig. 5) which meshes with an idler pinion 112 mounted on a stub shaft 114. The pinion 112 meshes with pinion 116 fixed to the end of shaft 74 which carries the pinion 72 which drives the peeler rings 54 (Fig. 6). It will thus be seen that when the lever is pulled forward or in a clockwise direction (Fig. 4), the discs 42 and peeler rings 54 are driven in directions to advance the tape. Furthermore, owing to the gearing used the peeler rings are rotated at a higher speed than the discs (about twice as fast in the particular example shown).

The feed discs and peeler rings are preferably mounted in such a way as to be capable of limited lateral movement so as to prevent binding and insure proper tracking with the tape. In the construction illustrated, the discs 42 are mounted on shaft 44 with some freedom of movement and are spaced on that shaft by spacing rings 120 and end collars 122 (Fig. 3). The shaft 44 is not a driving shaft, as the discs are rotated by the engagement of their peripheral teeth with the pinion 50 as already described. The peeler rings 54 are rotatable on the three spaced shafts, as described above, and are held in laterally spaced positions by their loose contact with the discs and by means of what may be termed a spacing "comb" comprising spacer discs 124 fixed to a cross bar 126 (Figs. 2, 7).

Any suitable device for severing the fed tape may be provided. A very simple arrangement is illustrated which consists of a tear-off blade 128, which is shown as removably mounted on a bar 130 carried by brackets 132. The latter may be adjustably attached to the frame of the machine by screws 134 (Fig. 1). The edge of the tear-off blade is adjusted so that it is opposite the point of intersection 68 between the feed and peeler surfaces, and is preferably quite close thereto. The blade may desirably be located at an angle of about 45° to the vertical; since approximately that angle is the most convenient one for tearing off tape and at the same time allows the operator to see what he is doing. Any other appropriate cutting or severing mechanism for the tape may be used, either automatic or manual.

The construction and arrangement of the feed discs and rings described gives a very obtuse tangent angle as appears from Figure 2, and as more particularly brought out in the diagram Fig. 10. Referring to the latter figure, if RF represents the radius of the feed discs and RP the radius of the peeler rings and OC the distance between the respective centers of rotation of the discs and rings, it will be seen that the tangent angle $\theta$ can be determined by the formula $$\cos(180° - \theta) = \frac{(RF)^2 + (RP)^2 - (OC)^2}{2(RF)(RP)}$$

As the distance OC is substantially less than RF or RP, it will be seen that the angle $\theta$ is quite obtuse. In the particular example illustrated it is in the neighborhood of 145°.

For purposes of comparison with the McCarthy construction, a typical example of the latter construction is shown in the diagram, Fig. 11. From this it will be seen that the distance OC between the centers of the feed discs and peeler discs is necessarily substantially greater than the radius of either of said discs. Actually the distance OC is equal to the radius RP (or RF if that is larger) plus the distance $rF$ (or $rP$) representing the radius of the shaft on which the other discs are mounted, including spacer rings, if used, plus whatever clearance (C) may be necessary. The formula for determining the tangent angle may then be written $$\cos(180° - \theta) = \frac{(RF)^2 + (RP)^2 - (RP + rF + C)^2}{2(RF)(RP)}$$

It can be readily shown that the most favorable condition for the McCarthy construction exists when the feed discs and peeler discs are of the same diameters, and therefore the radii of both may be simply represented by R. When this condition obtains the formula becomes $$\cos(180° - \theta) = \frac{2R^2 - (R + r + C)^2}{2R^2}$$

With reasonable values of R, r and C it will be found that the angle $\theta$ will work out to somewhere near a right angle (80° to 100°). In the particular example illustrated in Fig. 11 the angle $\theta$ is in the neighborhood of 80°. The absolute mathematical limit, assuming r and C reduced to zero, which of course is a physical impossibility, gives a value of $\theta$ of 120°. As has been above explained, a tangent angle of 80° or 100° (or even 120°) is too sharp to produce satisfactory feeding operation with most types of commercial tape. Therefore the construction of the McCarthy patents is unsatisfactory for a commercial dispenser. With applicant's invention, however, any degree of obtuseness of the tangent angle may be obtained, and therefore successful dispensers may be built for handling all commercial types of tape.

Another form of the invention utilizing feeder and peeler discs of circular outline is shown in Figs. 12 and 13. In accordance with this construction a pair of fixed cross rods 145 is provided on which are mounted two series of eccentric bearing discs 146 and 147. These discs may be made of or faced with suitable anti-friction material, if desired. The feed discs 136 are mounted to rotate on the bearing discs 146 and the peeler discs 138 are mounted to rotate on the bearing discs 147. Both sets of discs 136 and 138 are driven by suitable means, the peeler discs being driven faster than the feed discs. In the example shown two sets of driving pinions are mounted on the single drive shaft 140, the pinions 142 engaging the teeth of the discs 136 being smaller than the pinions 144 engaging the teeth on the peeler discs 138, so that the peeler discs are driven faster than the feed discs. This is a very simple and effective construction and enables the angle $\theta$ to be made as near 180° as is desired depending upon the eccentricity of the bearing discs 146 and 147. In the particular example shown, the angle $\theta$ is approximately 169°.

Instead of making both feed surfaces and peeler surfaces of circular form, one or both of said surfaces may be in the form of endless belts. A construction in which the feeding is done by belts and the peeling by discs is shown in Figs. 14 and 15. In this construction a feed roller or pulley 150 is provided which has on its surface flange portions 152 separated by grooves 154. The peeler roller or pulley 156 mounted on the driving shaft 158 has peeler flanges 160 separated by grooves 162. Endless belts 164 run over the flanges 152 on the roller 150 and on the bottoms of the grooves 162 on the roller 156. The belts may be made of rubber, fabric, metal or any other suitable material having the requisite flexibility. The tape is led from the tape supply roll over the surfaces of the belts where they pass around the flanges 152 of the roller or pulley 150, and adheres to the belt surfaces until peeled therefrom by the projecting peripheries of the flanges 160 on the roller or pulley 156. As the peripheries of the flanges 160 are of larger diameter than the surfaces on which the belts travel, the linear speed of the flange peripheries will be greater than the linear speed of the belts, so that a proper peeling action will take place. The angle $\theta$ between the straight part of the belts and the tangent to the flanged surfaces at the point of intersection P between the belt surfaces and the flanged surfaces is determined by the formula $$\cos(180° - \theta) = \frac{RF}{RP}$$

In the particular example given $\theta$ equals approximately 156°.

A form of the invention in which both feed surfaces and peeler surfaces are endless belts is shown in Figures 16 and 17. As here illustrated what may be termed the feeder roller or pulley comprises a series of separate pulleys mounted to turn freely on a shaft 170. There are two series of pulleys, one set 172 carrying the feeder belts 174 being of larger diameter than the second set 176 which carries the peeler belts 178. On the drive shaft 180 is mounted what may be termed a peeler roller or pulley 182 which has flange portions 184 over which pass the peeler belts, and grooves 186 over the bottoms of which pass the feeder belts. As pulley 182 is positively driven all of the belts are driven by contact with the respective surfaces forming part of such pulley, so that the peeler belts are driven at a much faster speed than the feeder belts. The tape passes over the exposed surfaces of the feeder belts as they pass around the pulleys 172 and is peeled off of the feeder belts by the peeler belts at the point P where the belts cross. In the particular example of the invention shown, the peeler belts are of round cross section, while the feeder belts are of rectangular cross section and have flat tape engaging surfaces. This gives a greater surface for feeding engagement between the tape and feeder belts than the engagement between the round peeler belts and the tape. Obviously any other suitable formation of belts adapted to the purpose may be utilized. With this construction the value of the angle $\theta$ is determined from the formula $$\sin\left(\frac{180° - \theta}{2}\right) = \frac{RP2 - RF2}{OC}$$

where RF2 is the radius of the outside of the feed belts where they pass around the bottoms of the grooves 186, and RP2 is the radius of the outside of the peeler belts where they pass around the peripheries of flange portions 184. In the particular example shown the angle $\theta$ is approximately 160°. Obviously by properly proportioning the parts, the angle $\theta$ can be made as obtuse as desired.

While certain preferred embodiments of the invention have been illustrated and described in detail, it is to be understood that changes may be made therein and the invention embodied in other structures. It is not, therefore, the intention to limit the patent to the specific constructions illustrated, but to cover the invention broadly in whatever form its principles may be utilized.

I claim:

1. A dispenser for pressure sensitive adhesive tape comprising a support for a roll of tape, a series of spaced feed discs to which the tape is adhered for feeding the tape from the roll, a series of spaced peeler discs mounted alternately with the feed discs, means for rotating said feed discs in tape feeding direction, means for rotating said peeler discs in the same direction as the feed discs but at a higher rate of speed, one set of said discs being mounted for rotation upon an axle and the other set of discs being in ring form and enclosing and bearing upon the axle supporting the first set of discs, and a second support for said ring-form discs passing through the rings outside of the peripheries of the axle supported discs.

2. A dispenser as claimed in claim 1 in which both sets of discs are capable of limited lateral movement.

3. A dispenser as claimed in claim 1 in which a spacing comb is provided having spacing elements projecting between the ring-form discs outside the peripheries of the axle supported discs.

4. A dispenser as claimed in claim 1 in which both sets of discs are provided with gear teeth on their peripheries which serve to engage the tape, the means for rotating said discs comprising driving pinions engaging said gear teeth.

5. A dispenser as claimed in claim 1 in which the disks in ring form are provided with peripheral gear teeth, and means for rotating said rings comprising a driving shaft having teeth thereon meshing with the teeth on the peripheries of said rings.

6. In a device for dispensing pressure sensitive tape, a plurality of feeder elements spaced apart transversely of the direction of feed having tape engaging surfaces traveling in curved paths over a portion of which the tape is fed, means for driving said feeder elements in tape feeding direction, means for providing a supply of such tape to said traveling surfaces to be fed thereby, a plurality of peeler elements spaced apart transversely of the direction of feed, said peeler elements having surfaces traveling in curved paths which intersect the paths of the feeder elements, the peeler elements being mounted to occupy the spaces between the feeder elements, the angle between the surface of the feeder elements and the surface of the peeler elements at the points of their intersection being not less than 120°, and means to drive the peeler elements in the same direction as the feeder elements but at a higher peripheral speed.

7. A device according to claim 6 wherein said tape engaging surfaces and said peeler element surfaces travel in circular paths.

8. A device according to claim 6 wherein at least one set of said peeler and feeder elements comprise an endless belt.

9. A device according to claim 6 wherein both feeder and peeler elements comprise endless belts.

10. In a device for dispensing pressure sensitive adhesive tape, a support for a roll of tape, a fixed supporting member, two series of bearing discs mounted on said member, one series of bearing discs being eccentric with respect to the other series of bearing discs, feed discs mounted for rotation in a circular path on one series of bearing discs and having tape engaging surfaces to which the tape is adapted to adhere for drawing the same from the roll of tape, a second series of discs constituting peeler discs mounted for rotation in a circular path on the second eccentric series of bearing discs, and means for rotating both feeder and peeler discs in the same direction, the peeler discs being rotated at a higher peripheral speed than the feeder discs and the tangents to the feeder discs and peeler discs at the point of intersection of their paths forming an angle of not less than 120°.

References Cited in the file of this patent

UNITED STATES PATENTS

| 560,231 | Riggs | May 19, 1896 |
| 804,306 | Fonda | Nov. 14, 1905 |
| 804,307 | Fonda | Nov. 14, 1905 |
| 1,710,211 | Gammeter | Apr. 23, 1929 |
| 1,742,814 | Jones et al. | Jan. 7, 1930 |
| 1,825,223 | Deck | Sept. 29, 1931 |
| 1,972,850 | McCarthy | Sept. 4, 1934 |
| 1,972,851 | McCarthy | Sept. 4, 1934 |
| 2,031,566 | Kranz et al. | Feb. 18, 1936 |
| 2,233,361 | Anderson et al. | Feb. 25, 1941 |
| 2,435,795 | Quinlan | Feb. 10, 1948 |
| 2,507,446 | Krueger | May 9, 1950 |
| 2,524,945 | Von Hofe | Oct. 10, 1950 |

FOREIGN PATENTS

| 8,824 | France | Apr. 28, 1908 |
| 611,313 | Germany | Mar. 26, 1935 |
| 680,687 | Great Britain | Oct. 8, 1952 |